United States Patent [19]

Patton, Jr. et al.

[11] 4,334,052

[45] Jun. 8, 1982

[54] RIGID, NON-CELLULAR POLYURETHANE MODIFIED WITH REACTION PRODUCT OF AN ISOCYANATE AND AN ALCOHOL

[75] Inventors: John T. Patton, Jr., Wyandotte, Mich.; Herwart C. Vogt, Sparta, N.J.; Manher Parekh, Warren, Mich.

[73] Assignee: BASF Wyandotte Corporation, Wyandotte, Mich.

[21] Appl. No.: 243,537

[22] Filed: Mar. 13, 1981

Related U.S. Application Data

[63] Continuation of Ser. No. 77,846, Sep. 21, 1979, abandoned.

[51] Int. Cl.$^3$ ............... C08G 18/38; C08G 18/16; C08G 18/71
[52] U.S. Cl. .................................. 528/52; 528/55; 528/58; 560/24; 560/25; 560/26; 560/27
[58] Field of Search ........................ 528/52, 76, 69

[56] References Cited

U.S. PATENT DOCUMENTS

| | | | |
|---|---|---|---|
| 3,437,608 | 4/1969 | Pohl | 521/115 |
| 3,746,692 | 7/1973 | Olstowski et al. | 528/49 |
| 3,801,532 | 4/1974 | Olstowski | 260/18 TN |
| 3,873,553 | 3/1975 | Hearsey | 560/25 |
| 3,883,465 | 5/1975 | Olstowski | 260/30.2 |
| 3,883,484 | 5/1975 | Olstowski | 260/18 TN |
| 3,886,102 | 5/1975 | Olstowski | 260/18 TN |
| 3,891,579 | 6/1975 | Cenker et al. | 528/49 |
| 3,919,279 | 11/1975 | Rosenthal et al. | 560/24 |
| 3,925,527 | 12/1975 | Kleimann et al. | 521/128 |
| 3,933,938 | 1/1976 | Rhodes et al. | 528/75 |
| 3,950,285 | 4/1976 | Wohlgemuth | 560/26 |
| 4,165,414 | 8/1979 | Narayan et al. | 521/117 |
| 4,172,948 | 10/1979 | Shave | 560/27 |
| 4,189,544 | 2/1980 | Thompson | 521/128 |

*Primary Examiner*—H. S. Cockeram
*Attorney, Agent, or Firm*—Norbert M. Lisicki

[57] ABSTRACT

Rigid, solid, non-cellular, urethane polymer compositions can be prepared which are the reaction product of at least one polyhydric alcohol with at least one organic polyisocyanate in the presence of a low molecular weight urethane modifier adduct which is the reaction product prepared, for instance, by reacting (1) at least one polyisocyanate and at least one monohydric alcohol or (2) at least one monofunctional isocyanate with at least one monohydric or polyhydric alcohol. Said adduct can also consist of mixtures of (1) and (2). Such polymers when prepared in the presence of any catalyst for urethane formation which is a liquid or solid at ambient temperature, set quickly to solid, rigid polymers having a density of at least one gram per cubic centimeter. They can be demolded after combining the materials, without the addition of heat from an external source, within a period of less than one minute to about 15 minutes. By proper selection of the urethane modifier adduct, flame-retardant polymers can be prepared.

4 Claims, No Drawings

RIGID, NON-CELLULAR POLYURETHANE MODIFIED WITH REACTION PRODUCT OF AN ISOCYANATE AND AN ALCOHOL

This application is a continuation of Ser. No. 077,846, filed Sept. 21, 1979, and now abandoned.

BACKGROUND OF THE INVENTION

1. Field of the Invention

This invention relates to polyurethanes and more particularly to rigid, dense, rapid-setting polyurethane molded compositions.

2. Description of the Prior Art

Rapid-setting polyurethane compositions are disclosed in U.S. Pat. No. 3,378,511 in which there is disclosed the reaction of a polyether polyol and a polyisocyanate in the presence of a modifying composition consisting of an ester such as dioctylsebacate, dioctylphthalate, and mixtures thereof. Rapid-setting polyurethane casting compositions have also been prepared in the prior art by substituting for the ester type plasticizer such as dioctylphthalate various diluents which prevent excessive bubbling which would, in their absence result from the heat generated by the exothermic heat of reaction. Generally, liquids known in the prior art which are useful as liquid modifying compositions have boiling points at atmospheric pressure above about 150 degrees centigrade and are illustrated by such compounds as fatty acids and oils, organic phosphates, such as tricresylphosphates, phosphites and phosphonates; cyclic polyethers, aromatic compounds free from ester groups (1-chloronaphthalene), halogenated aliphatic compounds (chlorinated paraffins), hydroxyl containing halogenated aliphatic compounds, cyclic sulfones (3-methylsulfonolane), and organic carbonates (propylene carbonate). The polyurethane compositions of the prior art are generally characterized as opaque as a consequence of the presence in substantial proportions of at least two phases. Representative U.S. Pat. Nos. are 3,746,692; 3,726,827; 3,801,532; 3,878,156; 3,725,355; 3,882,071; 3,883,465; 3,883,466; 3,883,484; 3,886,102; 3,886,182 and 3,914,918.

SUMMARY OF THE INVENTION

There are disclosed rigid, solid, non-cellular, urethane polymer compositions prepared by the reaction of at least one polyhydric alcohol and an organic polyisocyanate in the presence of a modifier which is the low molecular weight reaction product (1) of at least one polyisocyanate and at least one monohydric alcohol or the low molecular weight reaction product (2) of at least one monofunctional isocyanate with at least one monohydric alcohol or polyhydric alcohol or the low molecular weight reaction product of (3) at least one isocyanate-terminated quasi-prepolymer, prepared by reacting any polyisocyanate or mixtures thereof with at least one polyhydric alcohol, such as a polyester or polyether polyol, with at least one monohydric alcohol. Said casting modifier can also consist of mixtures of (1), (2), and (3). Said modifiers contain neither free isocyanate nor free hydroxyl groups and can be solids or liquids but are preferably liquids. The rapid-setting polymer compositions are catalyzed by a catalyst for urethane formation which is a solid or liquid at ambient temperature. In addition, there is disclosed a process for producing solid, rigid, bubble-free polyurethane articles having a density of at least 1 gram per cubic centimeter and a percent elongation of less than about 100 percent. These can be demolded within a period of less than 1 minute to about 15 minutes subsequent to combining a mixture comprising a polyhydric alcohol and an organic polyisocyanate. Addition of heat from an external source is usually not required.

DESCRIPTION OF THE PREFERRED EMBODIMENTS

The rapid-setting, rigid polymer compositions of the invention are particularly desirable over the prior art non-cellular polymer compositions in that the compositions of the invention provide transparent, clear, non-cellular compositions rather than the opaque compositions generally disclosed by the prior art. However, compositions of the invention containing a graft polyol tend to be opaque. The compositions of the present invention are useful in providing detailed reproduction in ornamental objects having intricate detail, which are characterized by excellent paintability and solvent resistance combined with excellent lubricity which is required in high modulus parts such as gears and other machine elements and automobile body parts such as fenders. Use of various proportions of the modifier of the invention in the preparation of polyurethane polymers provides a means of control over the exotherm temperature as well as time to reach maximum exotherm temperature. Physical properties of the polymer remain relatively unchanged over a broad range of proportions of modifier. In the preparation of the polyurethane compositions, the ratio of reactants (excluding the modifiers of the invention) is chosen so as to provide an NCO:OH ratio of about 0.8:1 to about 1.5:1, preferably about 0.9:1 to about 1.2:1.

The rigid, rapid-setting, solid polyurethane polymers can be prepared from the reaction of at least one polyhydric compound including a polyether polyol with an organic polyisocyanate in the presence of a modifier as previously described.

The Modifier Compound

The preparation of the modifier compounds of the invention is more particularly described by reference to the following equation:

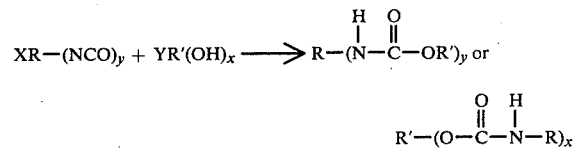

Wherein R and R', at least one of which is monovalent, are each individually selected from aliphatic, aromatic, aralkyl, and alkaryl radicals having up to about 18 carbon atoms in the aliphatic portion of the radical and 6 to 12 carbon atoms in the aromatic portion of the radical, x and y are integers and equal the number of functional groups in the isocyanate or hydroxy compound utilized, respectively, and X and Y are integers equal to x and y, respectively, and represent the molar ratio of reactants to yield the desired non-functional product. The modifier compounds of the invention are also disclosed in copending application, Ser. No. 243,536, filed on even date herewith entitled ⌊Foamed Urethane Polymer Containing Low Molecular Weight Urethane Modifier".

The Polyhydric Alcohol

The suitable monohydric and polyhydric alcohols useful in the preparation of the modifier compounds of the invention have an equivalent weight of about 30 to about 1000, can contain up to about 8 hydroxyl groups in the molecule, and can be low-molecular weight polyether and polyester polyols or mixtures thereof having up to about 18 carbon atoms such as hydroxyl-terminated polyether polyols or hydroxyl-terminated polyester polyols, as described below.

Suitable monohydric alcohols for preparing the modifier compound of the invention include both aliphatic and aromatic alcohols such as n-butanol, 2-chloroethanol, n-octanol, 2-ethylhexanol, isooctyl alcohol, nonanol, 3,5,5-trimethylhexanol, isodecyl alcohol, benzyl alcohol, cyclohexanol, 2,4,4,4-tetrachloro-1-butanol, 2,3-dichloropropanol, 2,3-dibromopropanol, 2,2,2-trichloroethanol, 2,2,2-tribromoethanol, 1,1,1,3,3,3-hexachloro-2-propanol, 1,1-dichloro-2-propanol, 1,3-dibromo-2-propanol, 1,1,1-trichloro-2-propanol, 1,1,3,3-tetrabromo-2-propanol, the isomeric tribromophenols, the isomeric tetrachlorophenols, pentachlorophenol, 2-methylol-1,4,5,6,7,7-hexachlorobicyclo-(2.2.1)-5-heptene and the like.

Also, the reaction products of halogenated alkylene oxides and monofunctional active hydrogen compounds are useful in the present invention. Thus, hydroxyl containing compounds such as 1-methoxy-4,4,4-trichloro-2-butanol, 1-ethoxy-3,3,3-trichloro-2-propanol, 2-methoxy-3,3-dichloropropanol and the like may be used. Alkylene oxide adducts of aliphatic alcohols are also suitable.

Suitable polyhydric alcohols include both aliphatic and aromatic compounds, for example, ethylene glycol, trimethylene glycol, propylene glycol, 1,4-butanediol, 1,3-butanediol, 1,2-butanediol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, sorbitol, diethylene glycol, dipropylene glycol, 2,3-dibromo-2-butenediol-1,4, 2,3-dibromobutanediol-1,4, dibromoneopentyl glycol, 4,4'-isopropylidene diphenol, also known as Bisphenol A, tetrabromobisphenol A, dibromobisphenol A, resorcinol, catechol, hydroquinone, and mixtures thereof.

Suitable polyether polyols are the adducts of a polyhydroxyl-containing compound preferably having a hydroxyl functionality of 2 to about 8 and a vicinal epoxy compound, for example, ethylene oxide, propylene oxide, 1,2-epoxybutane oxide, epichlorohydrin, epibromohydrin, and mixtures thereof. When the polyhydroxyl containing compound is a solid at room temperature, it is suitably modified for use by dissolving in a suitable solvent selected from the preferred liquid modifier compounds which are disclosed herein. As is well known to those skilled in the art, adducts of polyhydroxyl-containing compounds and vicinal epoxy compounds are often obtained as liquids at ambient temperature instead of solids where such compounds are prepared using ethylene oxide in admixture with a small amount of propylene oxide.

Suitable polyester polyols useful in the preparation of the modifier of the invention are, for example, aliphatic or aromatic polyester polyols preferably having a hydroxyl functionality of up to about 8 and are prepared, for example, by esterifying any suitable aliphatic polyol or aliphatic or aromatic polyhydric alcohol with an aromatic or aliphatic dicarboxylic acid or anhydride thereof having 2 to about 20 carbon atoms. Any suitable polycarboxylic acid may be used such as succinic acid, glutaric acid, adipic acid, pimelic acid, suberic acid, azelaic acid, sebacic acid, maleic acid, fumaric acid, glutaconic acid, α-hydromuconic acid, β-hydromuconic acid, α-butyl-α-ethyl-glutaric acid, α,β-diethylsuccinic acid, phthalic acid, isophthalic acid, terephthalic acid, hemimellitic acid, and 1,4-cyclohexanedicarboxylic acid.

Any suitable polyhydric alcohol, including both aliphatic and aromatic, halogenated and non-halogenated polyhydric alcohols can be used for preparing the polyester polyols. Representative polyhydric alcohols are ethylene glycol, diethylene glycol, trimethylene glycol, propylene glycol, dipropylene glycol, tripropylene glycol, 1,4-butane diol, 1,3-butane diol, 1,2-butane diol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. The aliphatic polyols useful for reaction with said dicarboxylic acid have up to about 20 carbon atoms and may contain minor amounts of polyhydric alcohols having up to about 8 hydroxyl groups per molecule as illustrated by polyhydroxyl-containing compounds such as glycerine, trimethylol propane, pentaerythritol, sorbitol, sucrose, and mixtures thereof.

The Organic Isocyanate

Suitable organic isocyanates which can be employed in the preparation of the rigid, solid polyurthane compositions and modifier compounds of the invention include any organic monoisocyanates or any organic polyisocyanate having 2 or more isocyanate groups per molecule and which contains no substituent other than the isocyanate group which is capable of reacting with the hydroxyl groups of the hydroxyl containing compound such as polyhydric alcohol, a polyether polyol, or a polyester polyol. Representative organic polyisocyanates include the aromatic diisocyanates, such as 2,4-toluene diisocyanate, 2,6-toluene diisocyanate, mixtures of 2,4- and 2,6-toluene diisocyanate, crude toluene diisocyanate, diphenylmethane diisocyanate, and the like; the aromatic triisocyanates such as 4,4',4''-triphenylmethane triisocyanate, 2,4,6-toluene triisocyanates; the aromatic tetraisocyanates, such as 4,4'-dimethyldiphenylmethane-2,2'-5,5'-tetraisocyanate, and the like; arylalkyl polyisocyanates, such as xylylene diisocyanate; aliphatic polyisocyanates, such as 1,6-hexamethylenediisocyanate, lysine diisocyanate methylester and the like; and mixtures thereof. Other organic polyisocyanates include hydrogenated methylene di(phenyl isocyanate), m-phenylene diisocyanate, naphthylene-1,5-diisocyanate, 1-methoxy-phenyl-2,4-diisocyanate, 4,4'-biphenylene diisocyanate, 3,3'-dimethoxy-4,4'-biphenylene diisocyanate, 3,3'-dimethyl-4,4'-biphenylene diisocyanate, 3,3'-dimethyldiphenylmethane-4,4'-diisocyanate, and polymeric isocyanates derived from toluene diisocyanate and diphenylmethane diisocyanate which contain isocyanurate, allophanate, urethane or carbodiimide structures. These polyisocyanates are prepared by conventional methods known in the art such as the phosgenation of the corresponding organic amine or by modification of isocyanates prepared in this way. Useful organic monoisocyanates include phenyl isocyanate, butyl isocyanate, octyl isocyanate, decyl isocyanate, dodecylisocyanate and the like. The modifiers of the invention generally have a molecular weight of about 90 to about 2000.

Still another class of organic polyisocyanates contemplated for use herein in the preparation of the compositions of the invention are the so-called "quasiprepolymers". These quasi-prepolymers are prepared by reacting an excess of organic polyisocyanate or mixtures thereof with a minor amount of an active hydrogen containing compound as determined by the well-known Zerewitinoff test as described by Kohler in *Journal of the American Chemical Society*, 40, 3181 (1927). These compounds and their methods of preparation are well known in the art. The use of any one specific active hydrogen compound is not critical hereto, rather any such compound can be employed herein. Generally, these prepolymers have a free isocyanate content of about 20 to about 40 percent by weight.

Quasi-prepolymers can be prepared by reacting an excess of an organic polyisocyanate with any organic compound having at least two active hydrogen-containing groups as determined by the Zerewitinoff method which are reactive with an isocyanate group such as —OH, —NH—, —COOH, and —SH. Examples of suitable types of organic compounds containing at least two active hydrogen-containing groups which are reactive with an isocyanate group are (1) hydroxyl terminated polyesters including polyester amides, (2) polyalkylene polyether polyols, (3) alkylene oxide adducts of phosphorus-containing acids, (4) hydroxyl-terminated polyacetals, and (5) aliphatic thiols including alkane, alkene and alkyne thiols having two or more —SH groups, as well as mixtures thereof. Compounds which contain two or more different groups within the above-defined classes may also be used in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-terminated polyester may be used to prepare quasi-prepolymers such as are obtained, for example, from polycarboxylic acids and polyhydric alcohols. Any suitable polycarboxylic acid may be used such as oxalic acid, succinic acid, glutaric acid, adipic acid, pimelic acid, suberic acid, azelaic acid, sebaic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol including both aliphatic and aromatic may be used, such as ethylene glycol, 1,3-propane diol, propylene glycol, 1,4-butylene glycol, trimethylene glycol, butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-terminated polyester used to prepare quasi-prepolymers may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-terminated polyester with only a portion of the components being a diamine such as ethylenediamine.

Any suitable polyoxyalkylene polyol may be used to prepare the quasi-prepolymer such as the polymerization of an alkylene oxide with a polyhydric alcohol. Any suitable polyhydric alcohol may be used to prepare the polyether polyol such as those disclosed above for use in the preparation of the hydroxyl-terminated polyesters. Any suitable alkylene oxide may be used to prepare the polyether polyol such as ethylene oxide, propylene oxide, butylene oxide, amylene oxide. The polyether polyols may be prepared from other starting materials such as tetrahydrofuran and epihalohdyrins such as epichlorohydrin; as well as aralkylene oxides such as styrene oxide. The polyoxyalkylene (polyether) polyols may have either primary or secondary hydroxyl groups and, preferably, are polyethers prepared from alkylene oxides having from 2 to 6 carbon atoms such as polyoxyethylene glycols, polyoxypropylene glycols, and polyoxybutylene glycols. The polyoxyalkylene polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Alkylene oxide adducts of Mannich condensation products are also useful in the invention.

Alkylene oxide adducts of acids of phosphorus which may be used in the preparation of the quasi-prepolymer include those neutral adducts prepared from the alkylene oxides disclosed above for use in the preparation of polyoxyalkylene polyols. Acids of phosphorus which may be used are acids having a $P_2O_5$ equivalency of from about 72% to about 95%. The phosphoric acids are preferred.

Any suitable hydroxyl-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol, and alkynethiols such as 3-hexyne-1,6-dithiol.

Also, polyether polyols containing ester groups can be employed in the preparation of the quasi-prepolymers. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541 and 3,639,542. As is clear from the above, the particular polyol ingredient employed in the preparation of the quasi-prepolymer is not a critical aspect of the present invention. Any compound containing at least two reactive hydrogen atoms can be so used.

The Amine- or Non-Amine-Containing Catalyst

Both amine and non-amine-containing catalysts for urethane formation are useful. The non-amine-containing catalysts being characterized as those having O—M bonds where M is a metal and are termed herein metallo-organic. The amine compounds are characterized as solids or liquids at ambient temperature. These catalysts are employed to catalyze the reaction of the polyhydric alcohol and the organic polyisocyanate. Useful metallo-organic compound, non-amine-containing catalysts include, for example, compounds of tin, zinc, lead, mercury, cadmium, bismuth and antimony, for example, the above metal salts of a carboxylic acid having from 2 to about 20 carbon atoms including, for example, stannous octoate, dibutyltin dilaurate, dibutyltin diacetate, zinc laurate, lead octoate, lead naphthenate, lead oleate, phenyl mercuric propionate, and mixtures thereof. Preferably, these catalysts are employed in liquid form and those catalysts which are not ordinarily liquid at room temperature can be utilized by preparing an organic solvent solution of the product. Suitable organic solvents can include, for example, esters such as dioctyl phthalate and medium boiling range hydrocarbons.

The concentration of the metallo-organic catalyst is generally about 0.2 weight percent of the weight of the total mixture of ingredients to about 8 weight percent, preferably about 0.2 weight percent to about 2 weight percent and most preferably about 0.5 weight percent to about 2 weight percent, all based on the total weight of the polyol utilized.

Useful amine catalysts include those conventionally used in the preparation of urethanes such as tetramethylenediamine, triethylenediamine, dimethylolaminoethanol, bis-(dimethylamino)ethyl ether, N-ethylmorpholine, N,N'-dimethylpiperazine, triethylamine, and dimethylcyclohexylamine. In addition, polyols prepared by the reaction of an alkylene diamine such as ethylenediamine, said alkylene group having about two to about eight carbon atoms, with at least one lower alkylene oxide such as ethylene oxide, propylene oxide, butyleneoxide, etc., have been found to be effective catalysts for the preparation of the polyurethanes of the invention. The amount of conventional amine catalyst used is generally about 0.2 percent by weight to about 8 percent by weight based upon the total weight of the polyol used. Preferably about 0.2 percent by weight by about 2 percent by weight, and most preferably about 0.5 percent to about 2 percent by weight, all based upon the weight of the polyol is used. The amine-containing polyol is used in more substantial amounts such as about 5 to about 100 percent by weight of the weight of the polyol utilized, preferably about 10 to about 50 percent by weight and most preferably about 10 to about 30 percent by weight. It may be desirable to use the amine-containing polyol as the sole catalyst as well as the sole source of hydroxyl groups for reaction with the isocyanate group-containing compound. In this case, the proportion used is governed by the amount of polyol necessary to obtain the desired physical characteristics in the casting. Preferably the amine catalysts are employed in the liquid form and those catalysts which are not ordinarily liquid at ambient temperatures are utilized by preparing organic solvent solutions thereof. Suitable organic solvents can include diols such as dipropylene glycol, tripropylene glycol, ethylene glycol, or propylene glycol.

The term "rigid" as employed herein relates to polyurethane polymers having a percentage elongation value of less than about 100 percent. The term "rapid-setting" as used herein refers to a composition which rapidly solidifies subsequent to combination of the reactants for the composition usually without the use of heat applied from an external source. Said compositions can usually be removed from a mold within less than one minute to about 15 minutes from the time the reactants are combined in the presence of a metallo-organic catalyst as described herein. The compositions can be removed from the mold and have only sufficient strength to be handled within the above times. However, for the compositions to gain sufficient strength to be employed for their intended purpose, a post cure at elevated temperatures may be required. The density of the rigid rapid setting polymers of the invention is at least about one gram per cubic centimeter.

The reaction to prepare the modifiers of the invention can take place at room temperature upon mixing the ingredients while stirring under a nitrogen atmosphere. The reaction is exothermic and cooling may be required to maintain the temperature between about 70 degrees to about 80 degrees centigrade. On completion of the reaction as indicated by the lack of exotherm, the mixture can be heated for one hour to insure completion of the reaction. Generally the alcohol reactant is used in the preparation of said modifiers at 1 percent excess of the stoichiometric equivalent portion to insure that all isocyanate groups are reacted so that the modifier obtained is essentially free of unreacted isocyanate groups. Any unreacted alcohol is stripped off the polymer modifier at reduced pressure. The molecular weight of useful modifier compounds is about 90 to about 2000 and preferably about 150 to about 900.

The low molecular weight urethane modifier compound of the invention is utilized in combination with the previously disclosed hydroxyl-containing reactants and organic polyisocyanate reactants in the proportion of about 2 percent by weight to about 75 percent by weight based upon the weight of all said reactants, preferably the concentration of low molecular weight modifier is about 5 percent to about 50 percent by weight based on the weight of all said reactants.

The rigid, rapid-set, solid polymers of the invention can include other components such as inert fillers, for example, sand, microballoons, glass fibers, asbestos, and fire-retardant agents.

The following examples illustrate the various aspects of the invention including methods of preparing the compositions of the invention but are not intended to limit its scope. Where not otherwise specified throughout this specification and claims, temperatures are given in degrees centigrade and parts, percentages and proportions are by weight.

DESCRIPTION OF COMPONENTS EMPLOYED IN THE EXAMPLES

Polyol A is a 1,2-propylene oxide adduct of glycerol having a functionality of 3 and an average molecular weight of about 300.

Polyol B is a high functionality polyoxypropylene polyol having a hydroxyl number of 397 and an average molecular weight of 425, prepared by reacting trimethylolpropane with propylene oxide.

Prepolymer X is the reaction product of 3620 grams of an 80/20 weight mixture of 2,4- and 2,6-toluene diisocyanate with 779 grams of a blend of 3856 grams of Polyol A and 429 grams of dipropylene glycol.

Prepolymer Y is prepared by reacting 3620 grams of an 80/20 weight mixture of 2,4- and 2,6-toluene diisocyanate with 779 grams of a blend of 3856 grams of Polyol B and 429 grams of dipropylene glycol.

Catalyst T-9 is a tin octoate catalyst which is commercially available from M&T Chemical having the following properties:

Specific gravity at 25° C., 1.25 to 1.27 percent tin total, 28-29%
percent stannous of total tin, 96.0% minimum
viscosity at 25° C., 360 cs. maximum.

EXAMPLE 1

The 2-ethylhexanol adduct of an 80/20 mixture in percent by weight respectively of 2,4- and 2,6-toluene diisocyanate was prepared for use in preparing the rigid, rapid set polyurethanes of the invention. The adduct is a modifier which is a liquid at ambient temperature. Use of said adduct as a component of said composition permits preparation of such polyurethanes free of voids and bubbles without detracting from the clarity thereof.

Utilizing a five-liter flask equipped with stirrer, thermometer, addition funnel, nitrogen sparge and a column with a drying tube, there was added an 80/20 mixture of 2,4- and 2,6-isomers of toluene diisocyanate in the amount of 1741 grams (10.0 mole). To this there was then added with rapid stirring 2630 grams (20.0 mole plus 1% excess) of anhydrous 2-ethylhexanol at a temperature of 27° C. During addition the temperature increased and the mixture required cooling to maintain a temperature of 70° C.-80° C. To insure completeness of reaction, the mixture was heated for one hour at a temperature of 70° C.-80° C. upon completion of the exotherm. The unreacted 2-ethylhexanol was removed from the adduct at a reduced pressure of less than 2 millimeters of mercury at a temperature of 70° C.-80° C.

EXAMPLES 2-6

In the same manner as illustrated in Example 1, 80/20 respectively 2,4- and 2,6-toluene diisocyanate adducts of alcohols were prepared utilizing the alcohols and proportions indicated in Table I below.

EXAMPLE 7

Utilizing the same procedure as in Example 1, diphenyl methane diisocyanate was utilized to prepare an adduct with 2-ethylhexanol by reacting 2002 grams (8 moles) of said isocyanate with 2084 grams of 2-ethylhexanol (16 moles). The product was found to have a molecular weight of 511.

EXAMPLE 8

Following the same procedure as in Example 1, an isocyanate-monohydric alcohol adduct was prepared by blending 1191 grams of phenyl isocyanate (10 moles) and 1302 grams of 2-ethylhexanol (10 moles) to produce an adduct having a molecular weight of 250 which is a liquid at ambient temperature useful as a modifier in the preparation of the polyurethane compositions of the invention.

TABLE I

| | Adduct Modifiers of the Invention | | | | |
|---|---|---|---|---|---|
| | 2,4 and 2,6 isomers of toluene diisocyanate | | alcohol | | adduct molecular weight |
| Examples | grams | moles | grams | moles | |
| 2 | 2442 | 14 | 2100 | 28.3 (n-butanol) | 322 |
| 3 | 1742 | 10 | 1610 | 20 (2-chloro-ethanol) | 335 |
| 4 | 1045 | 6 | 601 | 6 (cyclohexanol) | 405 |
| | | | 781 | 6 (ethylhexanol) | |
| 5 | 697 | 4 | 268 | 2 (dipropylene glycol) | 742 |
| | | | 520 | 4 (ethylhexanol) | |
| 6 | 174 | 1 | 432 | 2 (2,4,4,4-tetra-chlorobutanol-1) | 598 |

EXAMPLE 9

Following the same procedure as in Example 1, a phenyl isocyanate cyclohexanol adduct having a molecular weight of 219 was prepared by blending 1193 grams of phenyl isocyanate (10 moles) with 1002 grams (10 moles) of cyclohexanol to produce an adduct which is a liquid at ambient temperature and useful as a modifier in the preparation of the rigid, rapid-setting polyurethane compositions of the invention.

EXAMPLE 10

A rigid urethane composition of the invention was prepared by thoroughly blending in a clean container Polyol A, 103 grams with 94 grams of the 2-ethylhexanol adduct of an 80/20 mixture by weight of 2,4- and 2,6-toluene diisocyanate prepared in Example 1. The mixture was degassed for approximately 3 minutes at a pressure of 10 mm of mercury and then the mixture was added to 130 grams of Prepolymer X and 779 grams of a blend of Polyol A and 429 grams of dipropylene glycol. After insuring that the above ingredients are thoroughly mixed, 0.25 cc of a stannous octoate catalyst, available as Catalyst T-9 from the M&T Corporation, was rapidly stirred into the mixture and then the mixture was poured into a polished aluminum mold. After 75 seconds from the time the catalyst was added, the mixture was set as indicated by hardening. After 2 minutes from the time the catalyst was added, a rigid, hard, clear polymer molding was obtained. Physical properties of the molding were: tensile strength of 9800 pounds per square inch, elongation of 2%, and 74-73 Shore D hardness.

EXAMPLES 11-16

Following the procedure of Example 10, urethane moldings containing modifier adducts of the invention were prepared using the materials and proportions indicated in Table II. The polyurethane moldings, as prepared, were in all cases clear and substantially free of bubbles and strain marks. In additional experiments, it was found that maintaining a constant stoichiometry of Polyol A, Prepolymer X, and modifier while increasing catalyst level, decreased set time and time to reach peak exotherm temperature without affecting the physical properties of the cured molding.

TABLE II

| | Polyurethane Compositions of the Invention | | | |
|---|---|---|---|---|
| Example | Polyol A (grams) | Adduct Modifier (grams) | Prepolymer X (grams) | T-9 Catalyst (cc) |
| 11 | 103 | Example 1, 35 | 138 | 1.0 |
| 12 | 103 | Example 1, 141 | 138 | 2.5 |
| 13 | 103 | Example 1, 425 | 138 | 2.5 |
| 14 | 103 | Example 2, 35 | 138 | 1.0 |
| 15 | 103 | Example 2, 141 | 138 | 1.0 |
| 16 | 103 | Example 2, 425 | 138 | 1.0 |

TABLE II-continued

Polyurethane Compositions of the Invention

| Example | Shore D Hardness | Exotherm peak °C. | Set Time (seconds) | Tensile Strength (psi) | Elongation (%) |
|---------|------------------|-------------------|---------------------|------------------------|----------------|
| 11 | 81–79 | 150 | 15 | 9000 | 2 |
| 12 | 72–70 | 120 | 38 | 6400 | 3 |
| 13 | 43–36 | 84 | 130 | 1300 | 2 |
| 14 | 75–73 | 156 | 15 | 9900 | 2 |
| 15 | 71–68 | 126 | 20 | 5400 | 2 |
| 16 | 65–59 | 87 | 95 | 2500 | 1 |

EXAMPLES 17–20

The procedure of Example 10 was followed in preparing polyurethane compositions of the invention utilizing Prepolymer Y as indicated in Table III.

TABLE III

Polyurethane Compositions of the Invention

| Example | Polyol B (grams) | Adduct Modifier (grams) | Prepolymer Y (grams) | T-9 Catalyst (cc) |
|---------|------------------|-------------------------|----------------------|--------------------|
| 17 | 144 | Example 1, 35 | 143 | 1.0 |
| 18 | 144 | Example 1, 141 | 143 | 1.0 |
| 19 | 144 | Example 2, 35 | 143 | 1.0 |
| 20 | 144 | Example 3, 131 | 143 | 1.0 |

| Example | Shore D Hardness | Exotherm Peak °C. | Set Time (seconds) | Tensile Strength (psi) | Elongation (%) |
|---------|------------------|-------------------|---------------------|------------------------|----------------|
| 17 | 78–77 | 138 | 20 | 9400 | 5 |
| 18 | 64–61 | 113 | 45 | 4237 | 28 |
| 19 | 78–77 | 146 | 20 | 11800 | 4 |
| 20 | 76–74 | 108 | 25 | 6800 | 6 |

EXAMPLES 21–23

The procedure of Example 10 was repeated to prepare polyurethane compositions of the invention utilizing as the polyisocyanate, polymethylene polyphenylene polyisocyanate (solid under the trademark PAPI) together with propylene glycol as the polyol and the adduct casting modifier of Example 1 as shown in Table IV.

EXAMPLE 24

A polyurethane compositions of the invention was prepared utilizing an amine-containing compound as catalyst by thoroughly blending 30 grams of the adduct prepared in Example 1 with 50 grams of Prepolymer Z and 27 grams of N,N,N',N'-tetrakis(2-hydroxypropyl)-ethylenediamine sold under the trademark QUADROL ® polyol by BASF Wyandotte Corp. having an equivalent weight of 73.8. After thorough mixing of the above components, the mixture was poured into a mold, was set after 100 seconds, and was demolded after 4½ minutes from the time the mixture was combined with said QUADROL polyol. A rigid, clear polymer was obtained.

Prepolymer Z was prepared by reacting 535 grams of an 80/20 mixture of 2,4- and 2,6-toluene diisocyanate with 143 grams of a high functionality polyoxypropylene polyol having a hydroxyl number of 388 and a functionality of 3.

TABLE IV

Polyurethane Compositions of the Invention

| Example | Propylene Glycol (grams) | Adduct Modifier (grams) | Polyisocyanate (PAPI) (grams) | T-9 Catalyst (cc) |
|---------|--------------------------|-------------------------|-------------------------------|--------------------|
| 21 | 42 | Example 1, 60 | 138 | 0.5 |
| 22 | 42 | Example 1, 90 | 138 | 0.5 |
| 23 | 42 | Example 1, 120 | 120 | 0.5 |

| Example | Shore D Hardness | Exotherm Peak °C. | Set Time (seconds) | Tensile Strength (psi) | Elongation (%) |
|---------|------------------|-------------------|---------------------|------------------------|----------------|
| 21 | 78–77 | 169 | 25 | 3300 | 4.5 |
| 22 | 70–69 | 166 | 15 | 1000 | 2.0 |
| 23 | 70–70 | 148 | 15 | 440 | 1.5 |

While this invention has been described with reference to certain specific embodiments, it will be recognized by those skilled in the art that many variations are possible without departing from the scope and spirit of the invention and therefore that it will be understood that it is intended to cover all changes and modifications of the invention which do not constitute departures from the spirit and scope of the invention.

The embodiments of the invention in which an exclusive privilege or property is claimed are defined as follows:

1. In the process for the preparation of a noncellular, solid urethane polymer composition prepared by the reaction of a polyoxyalkylene polyether polyol with an organic polyisocyanate in the absence of a trimization catalyst, the improvement comprising the addition of from about 2 percent by weight to 75 percent by weight based upon the total weight of the polyether polyol and the organic polyisocyanate, an isocyanate-free, hydroxyl group-free reaction product of an organic isocyanate with a monohydric or polyhydric compound containing from 1 to 4 hydroxyl groups and from 2 to 18 carbon atoms prior to said reaction.

2. The process of claim 1 wherein said organic isocyanate is selected from the group consisting of phenyl isocyanate, toluene diisocyanate and diphenylmethane diisocyanate.

3. The process of claim 1 wherein said monohydric or polyhydric compound is selected from the group consisting of butanol, 2-ethylhexanol, glycerine, cyclohexanol, dipropylene glycol, butylene glycol, trimethylolpropane and pentaerythritol.

4. The process of claim 1 wherein said monohydric or polyhydric compound is selected from the group consisting of 2,4,4,4-tetrachloro-1-butanol, 2,3-dichloropropanol, 2,3,-dibromopropanol, 2-chloroethanol, 1,1,1,3,3,3-hexachloro-2-propanol, pentachlorophenol, 2-methylol-1,4,5,6,7,7-hexachlorobicyclo-2.2.1)-5-heptene, tetrabromobisphenol A, dibromobisphenol A, 2,3,-dibromobutanediol-1,4, dibromoneopentyl glycol, and 1,1,1-trichloro-2-propanol.

* * * * *